Oct. 20, 1936.   G. H. ZENI   2,058,116
AUTOMOBILE HEATER
Filed Feb. 23, 1934   2 Sheets-Sheet 1

INVENTOR
Giocondo H. Zeni
ATTORNEYS

Oct. 20, 1936.                G. H. ZENI                2,058,116
AUTOMOBILE HEATER
Filed Feb. 23, 1934              2 Sheets-Sheet 2

INVENTOR
Giocondo H. Zeni
BY
ATTORNEYS

Patented Oct. 20, 1936

2,058,116

UNITED STATES PATENT OFFICE 2,058,116

AUTOMOBILE HEATER

Giocondo H. Zeni, Detroit, Mich.

Application February 23, 1934, Serial No. 712,547

5 Claims. (Cl. 257—241)

The present invention pertains to a novel heater for automobiles and the like, and has reference more particularly to the class known as hot water heaters.

Conventional hot water heaters used in combination with automobiles and like vehicles ordinarily comprise a radiator mounted in the passenger compartment and means for connecting the radiator into the cooling water circulating system of the automobile engine. Although such type heaters are desirable for many reasons they are notoriously inefficient because of the fact that the water circulating through the engine cooling system does not become sufficiently hot in cold weather to provide for adequate heating of the automobile. Accordingly it is the primary object of the present invention to provide a hot water heater which is efficient in cold weather and this is accomplished by providing for the heating of the water in the heater system by the hot exhaust gases given off during operation of the engine. In providing for heating of the water of the heating system it is another object of the present invention to accomplish such heating without retarding the flow of the exhaust gases by setting up back pressure on the engine which would tend to render it less efficient.

With the above and other ends in view the invention consists in matters hereinafter set forth and more particularly pointed out in the appended claims, reference being had to the accompanying drawings, in which Figure 1 is a fragmentary cross section of an automobile, illustrating the present heater;

Like characters of reference are employed throughout to designate corresponding parts.

Figure 3:
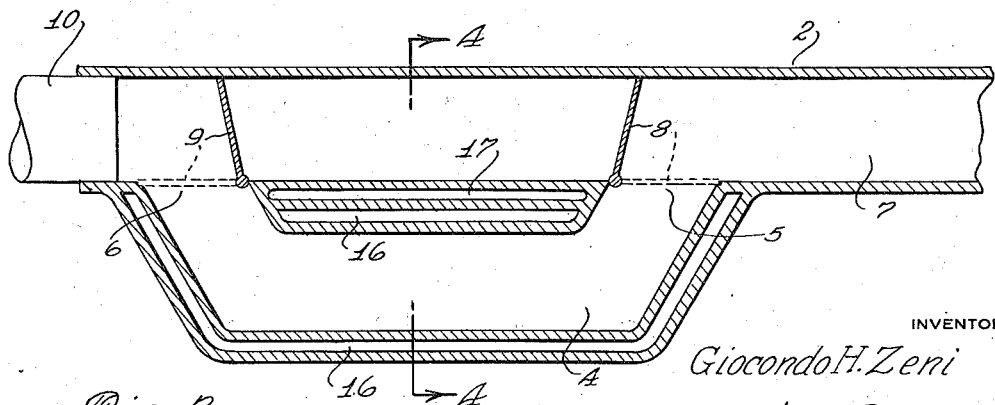
Fig. 3 is a horizontal cross section.
Figure 4:
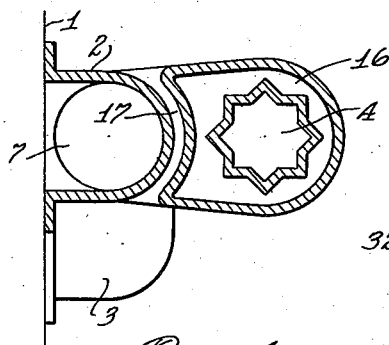
Fig. 4 is a cross section taken on the line 4—4 of Fig. 3.
Figure 5:
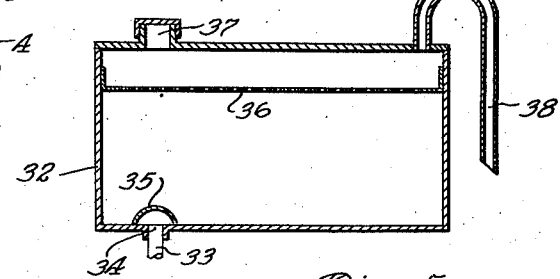
Fig. 5 is a cross section of a detail.
Figure 6:
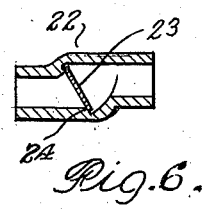
Fig. 6 is a cross section of a detail.

The numeral 1, designates an automobile engine having an exhaust manifold 2 formed with extensions 3 that are connected with the exhaust ports of the engine in the manner well known in the art. The present heater is embodied as an integral part of the manifold 2 and in this connection the manifold is formed with a by-pass 4 communicating at 5 and 6 with the ordinary passage 7. Valves 8 and 9 are mounted in the openings 5 and 6 respectively and when the valves 8 and 9 are in the positions shown in Fig. 3 the hot gases from the engine 1 that are collected in the passage 7 are directed through the by-pass 4 in order to reach the exhaust pipe 10 which is connected to one end of the passage 7.

Means is illustrated, by way of example, for manually controlling the valves 8 and 9, and includes pinions 11 mounted on stems 12 which are connected to the valves. A slidable rack bar 13 meshes with the pinions 11 so that longitudinal movement of the rack causes the pinions 11 to be rotated and the valves 8 and 9 to be moved to their open and closed positions in accordance with the direction of movement of the rack and pinions. A rod 14 has one end connected to the rack 13 and its other end extending through the dash or instrument board 15 of the automobile to provide manual means for causing movement of the rack. The rack 13 and valves 8 and 9 are illustrated in their open position wherein the exhaust gases are directed through the by-pass 4 and by moving the rack 13 the valves 8 and 9 may be caused to move to the positions shown in dotted lines, in which positions they prevent the exhaust gases from entering the by-pass 4.

Surrounding the by-pass 4 is a water jacket 16, the jacket being spaced from the manifold in order to provide a heat insulating air space 17 so that the heat from the manifold shall not cause the water in the jacket 16 to become heated to too great an extent when communication is cut off between the passage 7 and the by-pass 4. Leading from the top of the water jacket 16 is a pipe line 18 which is connected to a radiator 19 mounted on the toe-board 20 of the automobile. Inasmuch as numerous suitable types of radiators are available on the market and well known in the art the same has not been shown in detail. The pipe 18 is connected to the radiator adjacent to the top thereof and a return pipe line 21 extends from the lower part of the radiator to the lower part of the water jacket 16.

Mounted in the pipe line 21 is a check valve 22 for the purpose of defining the course of the water circulation so that when the water in the jacket 16 becomes heated it circulates through the pipe 18 to the radiator 19 and returns to the jacket through the pipe line 21. It will be understood that numerous valves of this general nature are available on the market and well known in the art and that the valve shown in Fig. 8 is by way of example only. The valve shown includes a flap 23 and a seat 24 so arranged that water flowing through the valve from the left hand end causes the flap to move away from its seat but, should there by any tendency for the water to flow in the opposite direction, the flap will be moved to its seat and will positively prevent any such flow.

A thermostat device 25 is mounted in the line 21 and inasmuch as thermostatic control devices of this nature are available on the market and well known in the art the same has not been shown in detail. The thermostat device includes an arm 26 adapted to be moved as a result of temperature conditions and mounted on the arm 26 is a pin 27 which extends through a slot 28 in the rack 13. A drain cock 29 is provided in the pipe line 21 and a temperature indicating member 30 is mounted on the dash 15 and connected by a tube 31 to the pipe line 18.

In order to fill the water jacket 16, pipe lines 18 and 21, and radiator 19 with water and maintain them full there is provided a reservoir 32. A pipe line 33 extending through the bottom of the reservoir as at 34 is connected to the line 21 adjacent to its lowermost point. In the reservoir is provided a baffle 35 over the opening 34 and also a baffle 36 for preventing the liquid from splashing around therein. The reservoir has a filling opening 37 and a breather pipe 38.

Figure 1:
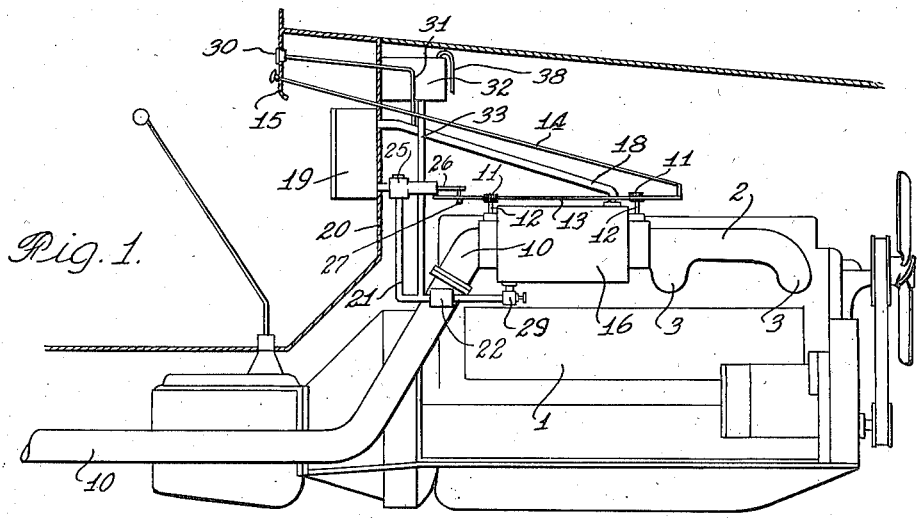
Figure 2:
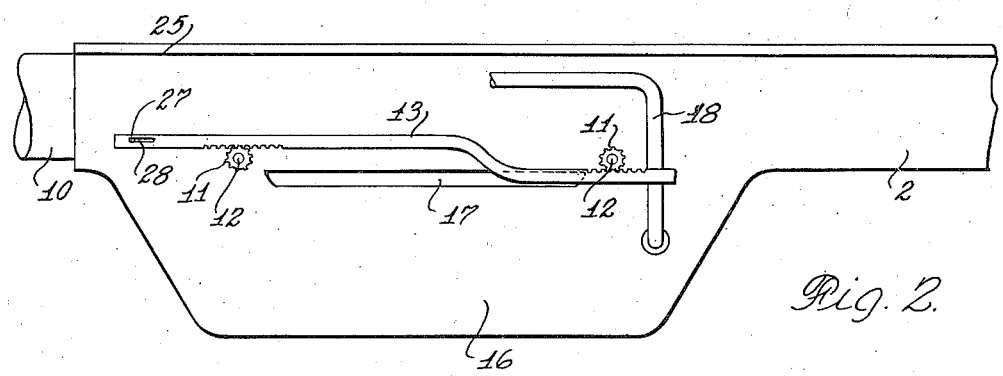
Fig. 2 is a plan of the heater.

In operation the operator of the vehicle, through manual pressure, moves the rod 14 to the position shown in Fig. 1. Movement of the rod 14 is accompanied by movement of the rack 13 which causes the valves 8 and 9 to move to positions shown in Fig. 3. The hot exhaust gases collected from the engine in the passage 7 are then directed through the by-pass 4 and the water in the jacket 16 surrounding the by-pass becomes heated. As the water becomes heated it circulates through the pipe 18 to the radiator 19 and through the pipe 21 back to the water jacket. The reverse of this circulation cannot take place because of the check valve 22. If it is desired to shut off the heater the same may be accomplished by drawing the rod 14 outwardly to cause a reverse movement of the rack 13, in which case the valves 8 and 9 will be moved to their positions shown in dotted lines in Fig. 3. The same reverse operation of the rack 13 may be caused by the pin 27 in the event that the thermostat 25 is operated due to the water in the line 21 becoming too hot.

It will be observed that the water may be easily replenished in the event of evaporation and that no damage can occur as a result of expansion or contraction of the water. However evaporation losses are found to be very small because of the fact that most of the hot water generated is cooled in the radiator 19 but should rapid expansion take place the baffle 35 prevents the hot water entering the reservoir from moving vertically through the cooler water in the reservoir directly upon entering the reservoir through the pipe 33 and thus decreases the tendency of the hot water to vaporize.

Although specific embodiments of the present invention have been illustrated and described it is to be understood that various changes may be made within the scope of the appended claims without departing from the spirit of the invention, and such changes are contemplated.

What I claim is:—

1. An automobile heater comprising a casing adapted to be secured to an automobile engine, said casing being formed with a manifold part adapted for the reception of hot fumes from said engine, said casing being formed with an integral by-pass extending in the direction and throughout a substantial portion of the length of said manifold in spaced relation thereto, said by-pass having its opposite ends communicating with said manifold, valve elements disposed with one at each end of said by-pass, said valve elements when in one position being adapted to direct fumes from said manifold into said by-pass and when in another position to close off communication between both ends of said by-pass with said manifold, and a water jacket formed integral with said casing and surrounding said by-pass, the exterior wall of said jacket being spaced from the exterior wall of said manifold.

2. An automobile heater comprising a casing adapted to be secured to an automobile engine, said casing being formed with a manifold part adapted for the reception of hot fumes from said engine, said casing being formed with an integral by-pass extending in the direction and throughout a substantial portion of the length of said manifold in spaced relation thereto, said by-pass having its opposite ends communicating with said manifold, valve elements disposed with one at each end of said by-pass, said valve elements when in one position being adapted to direct fumes from said manifold into said by-pass and when in another position to close off communication between both ends of said by-pass with said manifold, a water jacket formed integral with said casing and surrounding said by-pass, the exterior wall of said water jacket being spaced from the exterior wall of said manifold, and the by-pass within said water jacket being formed with an irregular heat radiating surface.

3. An automobile heater comprising a casing adapted to be secured to an automobile engine, said casing being formed with a manifold part adapted for the reception of hot fumes from said engine, said casing being formed with an integral by-pass extending in the direction and throughout a substantial portion of the length of said manifold, said by-pass having its opposite ends communicating with said manifold, valve elements disposed with one at each end of said by-pass, said valve elements when in one position being adapted to direct fumes from said manifold into said by-pass and when in another position to close off communication between both ends of said by-pass with said manifold, a water jacket formed integral with said casing and surrounding said by-pass, and means operatively uniting said valves to synchronize their movements.

4. An automobile heater comprising a casing adapted to be secured to an automobile engine, said casing being formed with a manifold part adapted for the reception of hot fumes from said engine, said casing being formed with an integral by-pass extending in the direction and throughout a substantial portion of the length of said manifold, said by-pass having its opposite ends communicating with said manifold, valve elements disposed with one at each end of said by-pass, said valve elements when in one position being adapted to direct fumes from said manifold into said by-pass and when in another position to close off communication between both ends of said by-pass with said manifold, a water jacket formed integral with said casing and surrounding said by-pass, and thermostatic means for moving said valves in synchronized relationship.

5. In combination with a manifold adapted to receive hot gases, a by-pass having both ends integrally connected to said manifold and the part between said ends spaced from said manifold, a water jacket surrounding said by-pass, and spaced from said manifold, valves disposed with one at each end of said by-pass, means connecting said valves to synchronize their movements, manual means for moving said first named means, and a thermostat device responsive to temperature changes in water in said jacket and connected to said first named means to move the same.

GIOCONDO H. ZENI.